US008914868B2

(12) United States Patent
Anantharamiah et al.

(10) Patent No.: US 8,914,868 B2
(45) Date of Patent: Dec. 16, 2014

(54) VENDOR-NEUTRAL POLICY BASED MECHANISM FOR ENABLING FIREWALL SERVICE IN AN MPLS-VPN SERVICE NETWORK

(75) Inventors: Prasanna Anantharamiah, Bangalore (IN); Venkata Raghavan Chekka, Bangalore (IN); Jimmi Skaria, Bangalore (IN); Vinodh T K Kumar, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 2735 days.

(21) Appl. No.: 11/367,653

(22) Filed: Mar. 3, 2006

(65) Prior Publication Data

US 2007/0209058 A1    Sep. 6, 2007

(51) Int. Cl.
*G06F 15/16*  (2006.01)
*H04L 12/24*  (2006.01)
*H04L 29/06*  (2006.01)

(52) U.S. Cl.
CPC ........ *H04L 41/0893* (2013.01); *H04L 41/0806* (2013.01); *H04L 63/0227* (2013.01); *H04L 63/0272* (2013.01)
USPC ............ 726/11; 726/1; 726/4; 726/6; 726/12; 726/13; 726/14; 726/15; 370/254; 370/338

(58) Field of Classification Search
USPC .................. 726/1, 4, 6, 11–15; 713/153–154; 705/79; 709/238–244; 370/254, 338
See application file for complete search history.

(56) References Cited

U.S. PATENT DOCUMENTS

| | | | | |
|---|---|---|---|---|
| 6,877,041 | B2 * | 4/2005 | Sullivan et al. | 709/238 |
| 6,941,474 | B2 * | 9/2005 | Boies et al. | 726/11 |
| 6,954,790 | B2 * | 10/2005 | Forslow | 709/227 |
| 7,107,613 | B1 * | 9/2006 | Chen et al. | 726/14 |
| 7,111,072 | B1 * | 9/2006 | Matthews et al. | 709/238 |
| 7,150,037 | B2 * | 12/2006 | Wolf et al. | 726/6 |
| 7,400,611 | B2 * | 7/2008 | Mukherjee et al. | 370/338 |
| 2003/0079030 | A1 * | 4/2003 | Cocotis et al. | 709/229 |
| 2004/0172557 | A1 * | 9/2004 | Nakae et al. | 713/201 |
| 2004/0268150 | A1 * | 12/2004 | Aaron | 713/201 |
| 2005/0235352 | A1 * | 10/2005 | Staats et al. | 726/14 |
| 2005/0265308 | A1 * | 12/2005 | Barbir et al. | 370/351 |
| 2006/0215578 | A1 * | 9/2006 | Andrapalliyal et al. | 370/254 |
| 2008/0127316 | A1 * | 5/2008 | Golan et al. | 726/5 |

OTHER PUBLICATIONS

CISCO IP Solution Center, 3.0: Security Management User Guide, 3.0 date : 2003.*
CISCO IP Solution Center, 3.1: MPLS VPN Management User Guide, 3.1 date : 2003.*
MPLS VPN Security by Michael H. Behringer; Monique J. Morrow.*

* cited by examiner

*Primary Examiner* — Thanhnga B Truong

(57) ABSTRACT

A technique that simplifies managing and configuring firewalls by provisioning a vendor-neutral firewall in an MPLS-VPN service network. In one example embodiment, this is accomplished by creating a vendor-neutral firewall policy using a service activation tool residing in a host server. One of the one or more VPNs requiring the provisioning of the vendor-neutral firewall in the MPLS-VPN service network is then selected. The created vendor-neutral firewall policy is then transformed to form a vendor-specific firewall policy associated with the selected one of the one or more VPNs.

21 Claims, 8 Drawing Sheets

VENDOR-NEUTRAL POLICY BASED MECHANISM FOR ENABLING FIREWALL SERVICE IN AN MPLS-VPN SERVICE NETWORK

TECHNICAL FIELD OF THE INVENTION

The present invention relates generally to MPLS-VPN (Multi-Protocol Label Switching-Virtual Private Network) service network, and more particularly relates to provisioning firewalls within the MPLS-VPN service network.

BACKGROUND OF THE INVENTION

With the growing popularity of the Internet and networks in general, there is a trend towards centralized network services, and centralized network service providers. To be profitable, however, network service providers need to constantly maintain and if possible enlarge their customer base and their profits. Since leased line services are coming under increased competition, profit margins have been decreasing for their providers. Thus, an increasing number of providers are trying to attract small and medium sized businesses by providing centralized network management system. Network providers are offering VPNs to interconnect various customer sites that are geographically dispersed. VPNs are of great interest to both provider and to their customers because they offer privacy and cost efficiency through network infrastructure sharing.

Today, a VPN virtually implementing, e.g., a company network on an IP (Internet Protocol) network is attracting increasing attention. Particularly, a MPLS-VPN using MPLS easily provides a VPN solution for supporting private addresses while securing customer data. The customer data is generally secured using firewalls so that a secure access is provided to legitimate remote users by allowing only known traffic across the firewall. Further, the firewalls ensure the VPN sites are secured when the Internet or Extranet access to VPN site is enabled.

Existing firewall provisioning systems allow an operator of a service provider to configure the sites so that one site can talk to a second site and not to a third site. The service provider may be an ILEC (Incumbent Local Exchange Carrier), a CLEC (Competitive Local Exchange Carrier), an ICX (Incoming Exchange), an ISP (Internet Service Provider), and/or the like. In order to operate properly it is desirable that the provisioning system be aware of the rules governing the communication between different sites of a VPN and allow configuration of the VPN based on those rules.

However, current firewall provisioning systems require the knowledge of various vendor specific routing policies and firewall configurations or they are customized implementations. Also, firewall provisioning systems require customizing firewall policies based on vendor specific requirements. Further, such topology constrained firewall may have to be provisioned between one or more sites in a large MPLS-VPN service network and this can be very cumbersome and time consuming. Furthermore, managing these firewalls during a security breach or other such situations can be a nightmare to network and system administrators.

SUMMARY OF THE INVENTION

According to an aspect of the subject matter, there is provided a method for provisioning firewalls in a MPLS-VPN service network by creating a vendor-neutral firewall policy, selecting one of the one or more VPNs that requires provisioning a vendor-neutral firewall, and transforming the created vendor-neutral firewall policy to a vendor-specific firewall policy as a function of the selected one of the one or more VPNs.

BRIEF DESCRIPTION OF THE DRAWINGS

Embodiments of the invention will now be described, by way of example only, with reference to the accompanying drawings in which.

DETAIL DESCRIPTION OF THE INVENTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The term "MPLS-VPN service network" refers to a private network that enables private communications between two or more private networks over a shared MPLS network. The VPN can include multiple provider edge (PE) routers connected to the shared MPLS network and configured to dynamically distribute VPN information across the shared MPLS service network.

Figure 1:
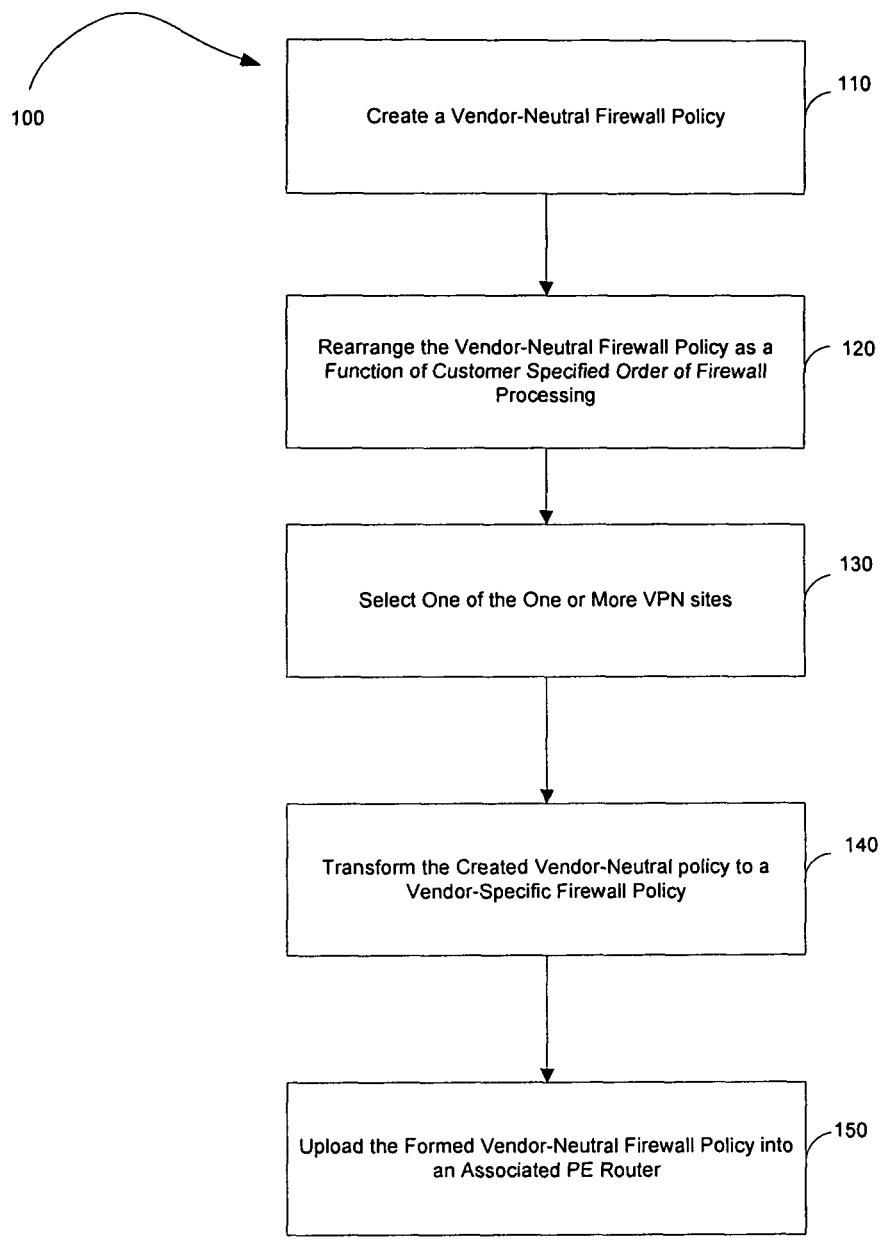
FIG. 1 is a flowchart illustrating an example method for provisioning firewall service in an MPLS-VPN service network according to an embodiment of the present subject matter.

FIG. 1 illustrates an example method 100 for provisioning firewalls in a MPLS-VPN service network. At step 110, this example method 100 begins by creating a vendor-neutral firewall policy. In some embodiments, this step can include creating a vendor-neutral firewall policy using a service activation tool. The service activation tool is a workflow based mechanism that configures a service on a network/equipment. In these embodiments, creation of vendor-neutral firewall policy includes first forming one or more access control lists (ACLs) in a vendor-neutral format using the service activation tool for each firewall. One or more fix-up rules associated with the formed one or more ACLs in a vendor-neutral format are then configured using the service activation tool for each firewall. In these embodiments, the service activation tool is a generic graphical user interface tool that facilitates in configuring the vendor neutral firewall policy.

Figure 2:
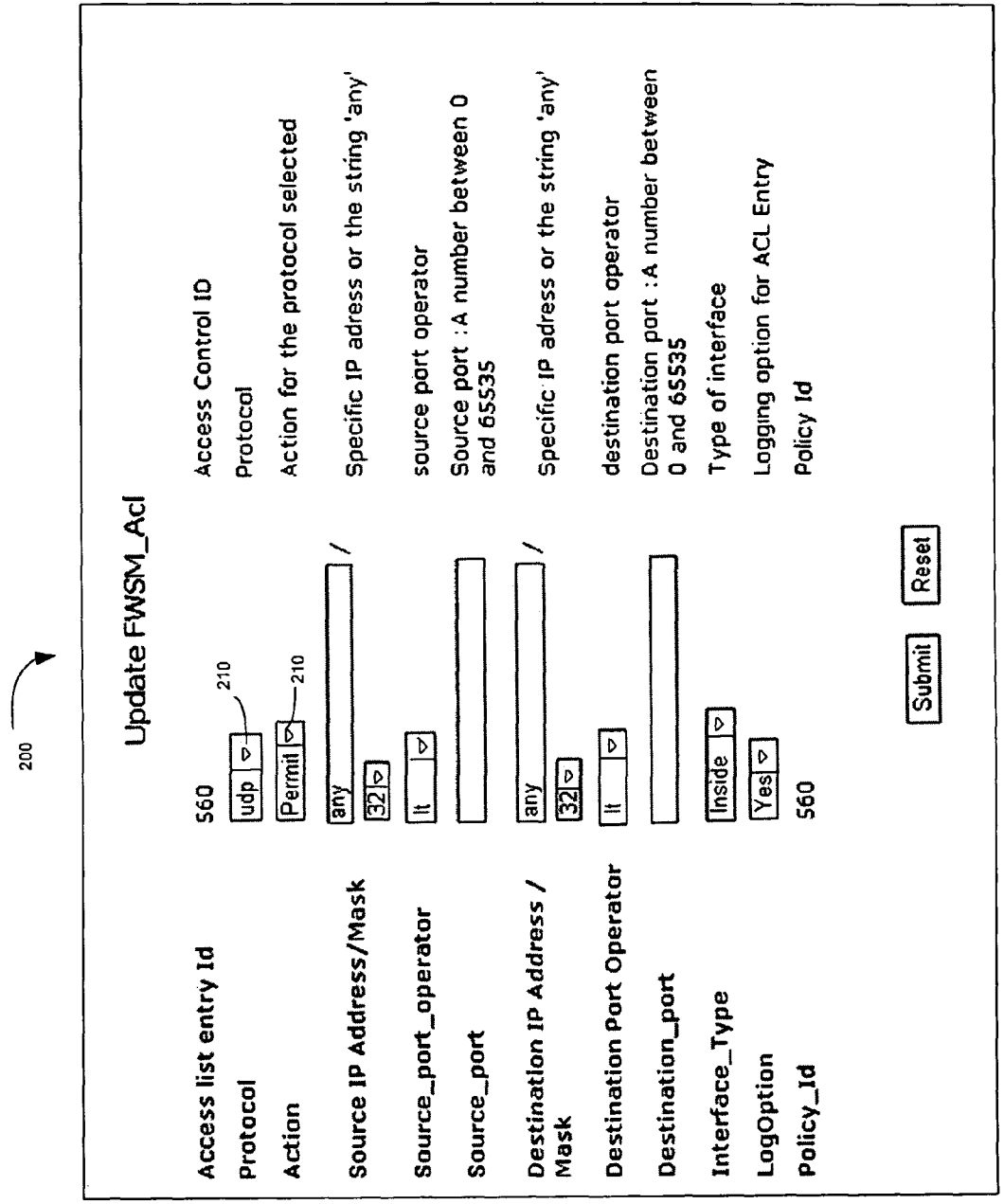
FIG. 2 is a screenshot of a graphical interface used in creation and modification of access control entries (ACEs) according to an embodiment of the present invention.

FIG. 2 shows an exemplary screenshot 200 that is used in creating and modifying of access control entries (ACEs). The graphical interface shown in the screenshot 200 is used to create the ACEs, for each ACL, is generic and is designed to configure firewalls of various vendors by using the drop down menu provided for each ACE. The drop down menus 210 shown in the screenshot 200 can be used to create the ACEs in a sequential order as a firewall module operates on packets when entering a network.

Figure 4:
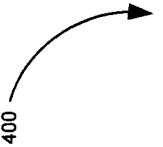
FIG. 4 is a screenshot of a graphical interface used in fix-up configuration according to an embodiment of the present invention.

FIG. 4 is an exemplary screenshot 400 that is used in the fix-up configuration. Typically, the graphical interface shown in the screenshot 400 can be used by an operator to configure a set of policies used commonly in a firewall. Further, this graphical interface facilitates in copying an existing "firewall container" object and in renaming the firewall policy. Again, the drop down menus 410 shown in the graphical interface can be used in customizing the firewall container based on customer requirements.

Figure 3:
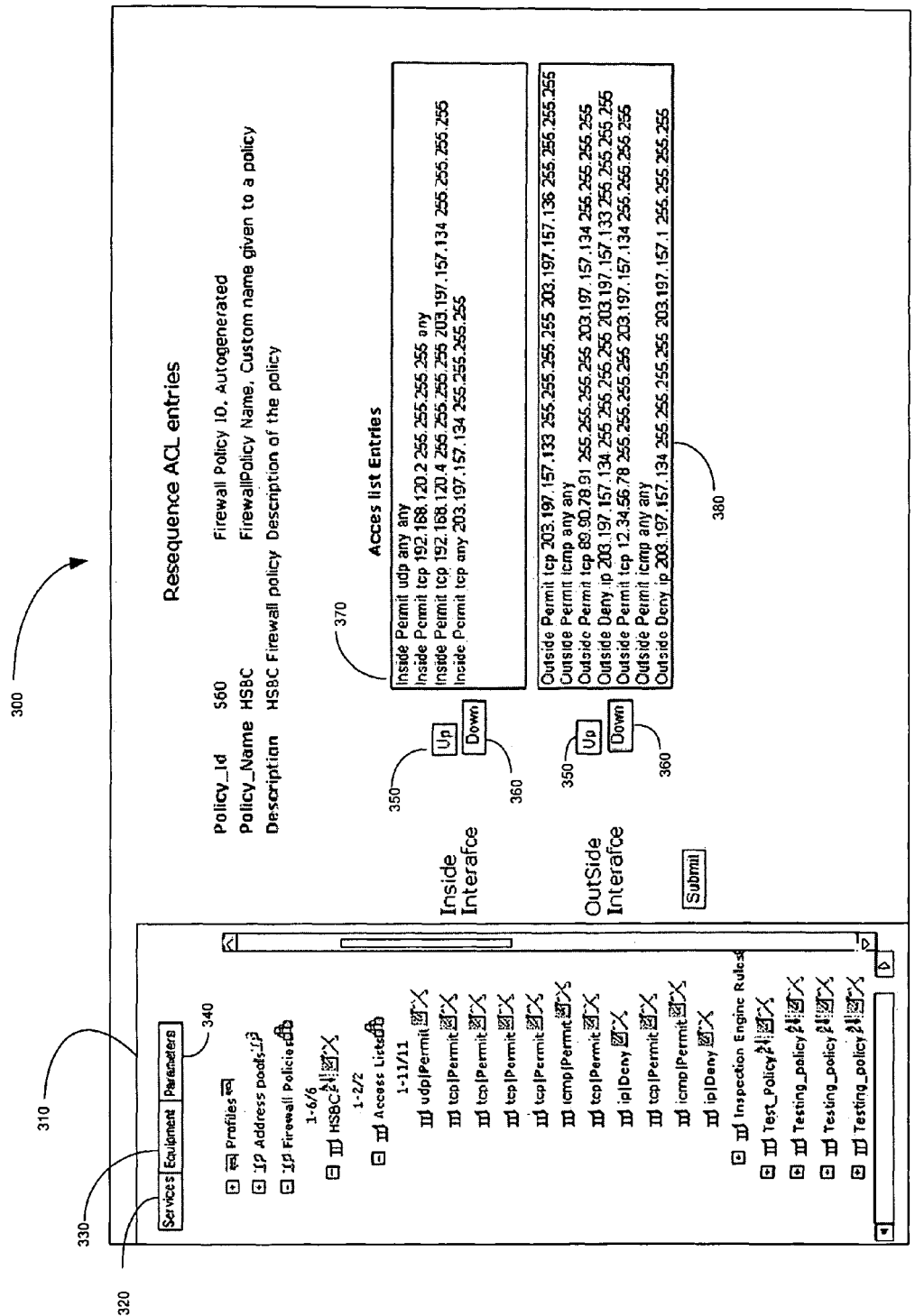
FIG. 3 is a screenshot of a graphical interface used in re-sequencing an ACE within an access control list (ACL).

At step 120, the sequence of processing each of the formed one or more ACEs associated with an ACL is rearranged based on a customer specified order of firewall processing using a simple user friendly graphical interface. In some embodiments, the customer specified order includes a hierarchy of processing of the ACEs formed within an ACL. It can be envisioned that such hierarchy can be changed easily using the graphical interface anytime as and when the needs of a customer changes. FIG. 3 is an exemplary screenshot 300 of a graphical interface that is used in re-sequencing an ACE within an access control list (ACL) to prioritize ACEs. The Up and Down buttons 350 and 360 provided on the left side of shown inside and outside interfaces is used to sequence the ACEs. 370 and 380 facilitates user in choosing and reprioritizing the ACEs. In these embodiments, the vendor-specific firewall policy includes vendor-specific commands. The transformed vendor-specific firewall policy has the association between the MPLS-VPN service network and the firewall equipment used in the selected VPN. In some embodiments the transformation is achieved sequentially as follows:

Selecting the VPN that requires the firewall service.

Selecting appropriate "Firewall" policy from one of the firewall policies created using the above described process.

Submitting the request to transform the firewall to a vendor-specific firewall policy.

Also shown in the screenshot 300 is a left panel 310 that allows selection of the firewall components, such as firewall services 320, equipment 330, and associated parameters 340.

Figure 5:
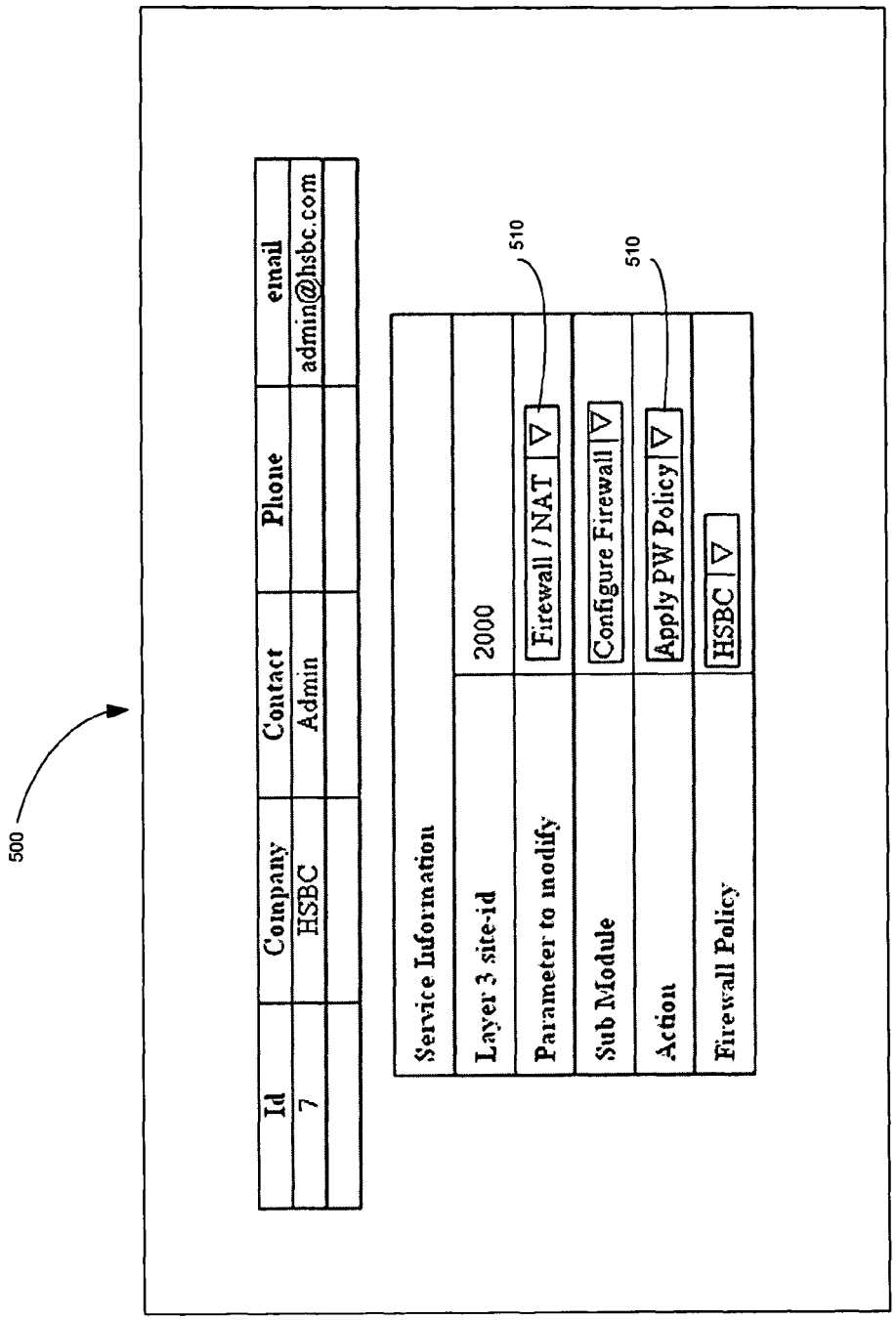
FIG. 5 is an exemplary screenshot of a graphical interface used in transforming the formed vendor-neutral firewall to a vendor-specific firewall.

At step 130, one of the one or more VPNs that require provisioning a vendor-neutral firewall is selected. At step 140, created vendor-neutral firewall policy is transformed to a vendor-specific firewall policy based on the selected one of the one or more VPNs. FIG. 5 is an exemplary screenshot 500 that shows the graphical interface used to transform the created vendor-neutral firewall policy to the vendor-specific firewall policy. As shown in FIG. 5, it can be seen using the drop down menus 510 how the created vendor-neutral firewall policy and the required vendor-specific information can be selected to transform to created the vendor-specific firewall policy. At step 150, the formed vendor-neutral firewall policy is uploaded into a provider edge (PE) router associated with the selected one of the one or more VPNs.

Although the flowchart 100 includes steps 110-150 that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Although the embodiments of the present invention are described in the context of non-distributed environment they can be very much implemented in the distributed environment as well.

Figure 6:
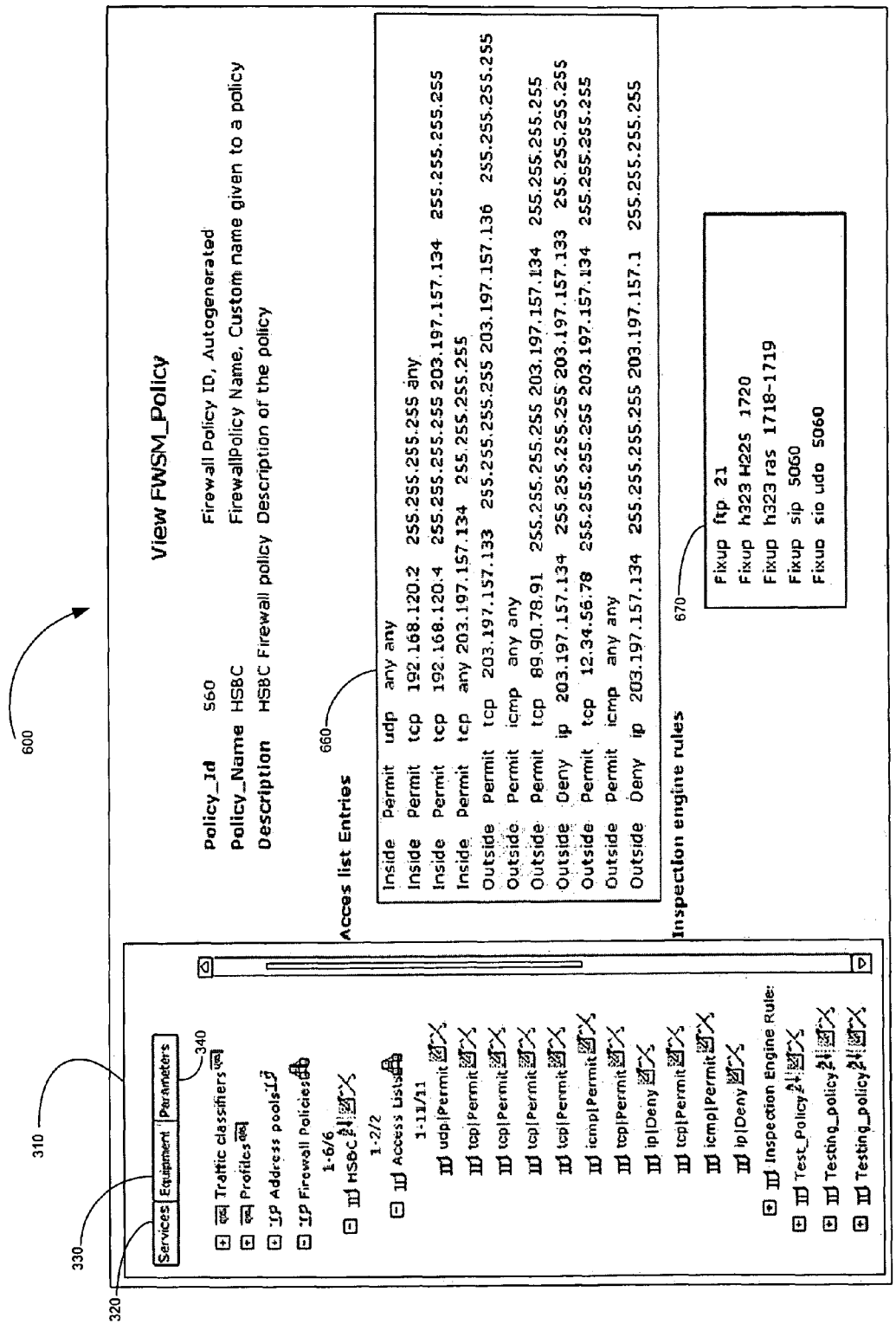
FIG. 6 is an exemplary screenshot showing a vendor-specific firewall created using the embodiments shown in FIGS. 1-5

Referring now to FIG. 6, there is shown a screenshot 600 including a portion of the created vendor-specific firewall policy for a vendor using the above described technique with reference to FIGS. 1-5. The screenshot 600 including the portion of the created firewall policy shows formed access list entries 660 and the inspection engine rules 670.

Figure 7:
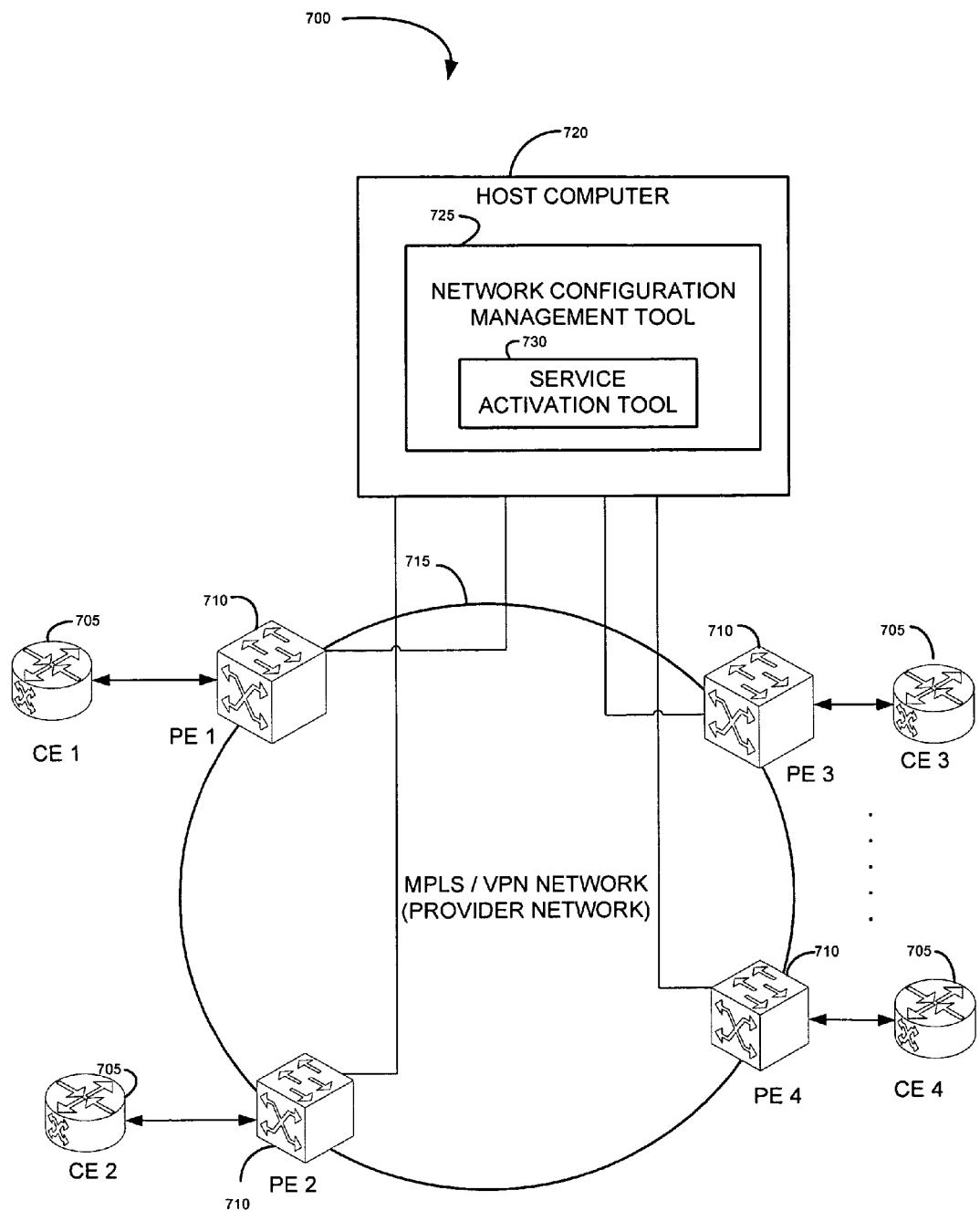
FIG. 7 is a block diagram that illustrates a MPLS-VPN service network that provides a vendor-neutral firewall provisioning service according to an embodiment of the present subject matter.

Referring now to FIG. 7, there is illustrated an embodiment of a MPLS-VPN network 700 that can be used to create and provision a vendor-neutral firewall. As shown in FIG. 7, the MPLS-VPN network 700 includes CEs 705 coupled to associated provider edge routers 710. Further, as shown in FIG. 7, the PEs 710 are coupled to a provider network 715. Also as shown in FIG. 7, the MPLS-VPN network 700 further includes a host computer 720 that includes a network configuration management tool 725 and a service activation tool 730 that is used in creating and provisioning the vendor-neutral firewall. Furthermore as shown in FIG. 7, the host computer 720 is coupled to the PEs 710 via administration or management VPN.

In operation, a vendor-neutral firewall policy is created using the service activation tool 730. Upon completion of creating the vendor-neutral firewall policy, the service activation tool 730 then selects one or more VPNs that require provisioning a vendor-neutral firewall. The service activation tool 730 then transforms the created vendor-neutral firewall policy to a vendor-specific firewall policy as a function of the selected one of the one or more VPNs. In these embodiments, the service activation tool 730 is a generic graphical user interface tool that facilitates in creating the vendor-neutral firewall policy.

In these embodiments, the service activation tool 730 forms one or more ACLs in a vendor-neutral format for each required firewall. The service activation tool 730 then configures one or more fix-up rules associated with the one or more ACLs in a vendor-neutral format for the firewall.

Further in these embodiments, each ACL comprises one or more ACEs. The service activation tool 730 can be used to rearrange sequence of processing of each formed ACE as a function of a customer specified order of firewall processing. The network configuration management tool then uploads the formed vendor-specific firewall policy into one or more PEs associated with the selected VPN. The operation of the MPLS-VPN network 700 to form a vendor-specific firewall policy is explained in more detail with reference to FIGS. 1-6.

Various embodiments of the present subject matter can be implemented in software, which may be run in the environment shown in FIG. 8 (to be described below) or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Figure 8:
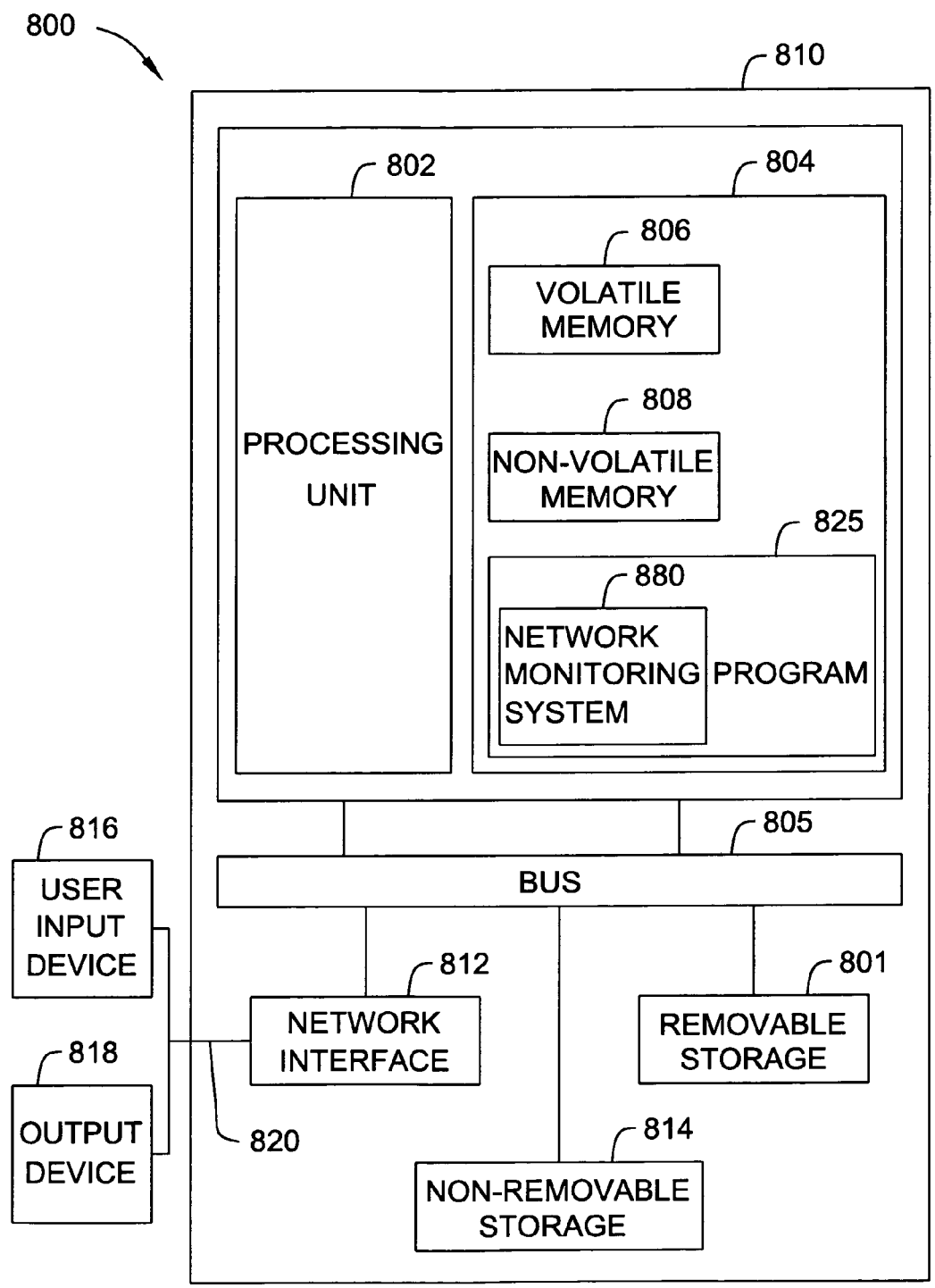
FIG. 8 is a block diagram of a typical computer system used for implementing embodiments of the present subject matter shown in FIGS. 1-8.

FIG. 8 shows an example of a suitable computing system environment for implementing embodiments of the present subject matter. FIG. 8 and the following discussion are intended to provide a brief, general description of a suitable computing environment in which certain embodiments of the inventive concepts contained herein may be implemented.

A general computing device, in the form of a computer 810, may include a processor 802, memory 804, removable storage 801, and non-removable storage 814. Computer 810 additionally includes a bus 805 and a network interface 812.

Computer 810 may include or have access to a computing environment that includes one or more user input modules 816, one or more output modules 818, and one or more communication connections 820 such as a network interface card or a USB connection. The one or more output devices 818 can be a display device of computer, computer monitor, TV screen, plasma display, LCD display, display on a digitizer, display on an electronic tablet, and the like. The computer 810 may operate in a networked environment using the communication connection 820 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 804 may include volatile memory 806 and non-volatile memory 808. A variety of computer-readable media may be stored in and accessed from the memory elements of computer 810, such as volatile memory 806 and non-volatile memory 808, removable storage 801 and non-removable storage 814. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 802 of the computer 810. For example, a program module 825 may include machine-readable instructions capable of determining a primary network element failure in a computer network according to the teachings and herein described embodiments of the present subject matter. In one embodiment, the program module 825 may be included on a CD-ROM and loaded from the CD-ROM to a hard drive in non-volatile memory 808. The machine-readable instructions cause the computer 810 to encode according to the various embodiments of the present subject matter. As shown, the program module 825 includes a network monitoring system 830. In these embodiments, the network monitoring system 830 includes instructions to determine primary and secondary point of failures in a network system according to various embodiments of the present invention.

The operation of the computer system 800 for determining primary and secondary network element failures in a computer network is explained in more detail with reference to FIGS. 1-7.

The above-described policy based mechanism for provisioning a firewall in an MPLS-VPN service network provides ability to quickly define and customize firewall provisioning rules. Further, provides ability to capture and store firewall configurations policies in a vendor-neutral format. Furthermore, the above process simplifies network management by allowing network administrators to keep a set of vendor-neutral firewall templates that can be transformed into vendor-specific firewall policies based on the router equipment (or external firewall equipment) used in a VPN. The above process simplifies the provisioning of the firewall configurations by a creating a provisioning system that includes a set of ACLs and fix-up rules that can be used to provision vendor-specific firewall policies.

The above process facilitates in managing large number of "firewall" configurations across many enterprise customers. Further, the process allows re-using common set and/or industry standard "firewall" configurations across many enterprise customers. Furthermore, the process helps manage firewall configurations for networks such as "MPLS/VPN service provisioning system" that can be used across different types of "firewall vendors". Although, the above example embodiments shown in FIGS. 1-8 are explained with reference to MPLS/VPN network, the above-described technique is not limited to MPLS/VPN network it can be used within any network environment.

The above process provides a common policy to configure firewalls for router equipment from different vendors. Further, the above process provides a standardized approach for defining firewalls. Furthermore, the above process simplifies the creation and modification of software policies by keeping policy and actual configuration commands separate. The above process requires the user to only know the firewall configuration requirements and not the vendor-specific configuration commands when provisioning the firewall policies. Further, a user can easily and quickly modify an existing firewall policy to meet any changes in vendor router equipment and customer needs.

The above technique can be implemented using an apparatus controlled by a processor where the processor is provided with instructions in the form of a computer program constituting an aspect of the above technique. Such a computer program may be stored in storage medium as computer readable instructions so that the storage medium constitutes a further aspect of the present subject matter.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 1 can be performed in a different order from those shown and described herein.

FIGS. 1-8 are merely representational and are not drawn to scale. Certain proportions thereof may be exaggerated, while others may be minimized. FIGS. 1-8 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus the following claims are hereby incorporated into the detailed description of the embodiments of the invention, with each claim standing on its own as a separate preferred embodiment.

The invention claimed is:

1. A method for provisioning firewalls in one or more networks comprising:
creating a vendor-neutral firewall policy;
selecting one of the one or more networks that requires provisioning a vendor-neutral firewall;
transforming the created vendor-neutral firewall policy to a vendor-specific firewall policy as a function of the selected one of the one or more networks; and
uploading the vendor-specific firewall policy to at least one router of the selected one of the one or more networks.

2. The method of claim 1, wherein selecting one of the one or more networks comprises:
selecting one or more virtual private networks (VPNs) that requires provisioning a vendor-neutral firewall, wherein the one or more firewalls are associated with the one or more VPNs in a multi-protocol label switching (MPLS)-VPN service network.

3. The method of claim 1, wherein transforming the created vendor-neutral firewall policy comprises:
transforming the created vendor-neutral firewall policy to a vendor-specific firewall policy as a function of the selected one of the one or more VPNs.

4. The method of claim 3, wherein, in creating the vendor-neutral firewall policy, a service activation tool comprises:
a generic graphical user interface tool that facilitates in configuring the vendor-neutral firewall policy.

5. The method of claim 3, wherein creating the vendor-neutral firewall policy comprises:
forming one or more access control lists (ACLs) in a vendor-neutral format using a service activation tool for each firewall; and
configuring one or more fix-up rules associated with the formed one or more ACLs in a vendor-neutral format using the service activation tool for each firewall.

6. The method of claim 5, wherein, in forming the one or more ACLs, each of the ACLs comprises one or more access control entries (ACEs).

7. The method of claim 6, further comprising:
rearranging the sequence of processing each of the formed one or more ACEs associated with an ACL as a function of a customer specified order of firewall processing using a simple user friendly graphical user interface tool.

8. The method of claim 3, wherein, in transforming the created vendor-neutral firewall policy to a vendor-specific firewall policy, the vendor-specific firewall policy comprises vendor-specific commands.

9. The method of claim 3, further comprising:
uploading the formed vendor-specific firewall policy into a provider edge (PE) router associated with the selected one of the one or more VPNs.

10. The method of claim 1, wherein creating the vendor-neutral firewall policy comprises:
creating the vendor-neutral firewall policy using a service activation tool.

11. A computer-readable storage medium having instructions stored thereon such that said instructions, when executed by a computing platform, result in execution of a method for provisioning one or more firewalls associated with one or more Virtual Private Networks (VPNs) in a Multi-Protocol Label Switching-Virtual Private Network (MPLS-VPN) service network comprising:
creating a vendor-neutral firewall policy;
selecting one of the one or more VPNs that requires provisioning a vendor-neutral firewall; and
transforming the created vendor-neutral firewall policy to a vendor-specific firewall policy as a function of the selected one of the one or more VPNs.

12. A Multi-Protocol Label Switching-Virtual Private Network (MPLS-VPN) service network comprising:
a service activation tool residing in a host computer; and
one or more Virtual Private Networks (VPNs) that comprise:
one or more provider edge routers (PEs) that are coupled to a MPLS-VPN network; and
one or more associated customer edge routers (CEs) that are coupled to the associated PEs, wherein the service activation tool is coupled to the one or more PEs that create a vendor-neutral firewall policy, wherein the service activation tool selects one or more VPNs that require provisioning a vendor-neutral firewall, and wherein the service activation tool transforms the created vendor-neutral firewall policy to a vendor-specific firewall policy as a function of the selected one of the one or more VPNs.

13. The service network of claim 12, wherein the service activation tool comprises:
a generic graphical user interface tool that facilitates in creating the vendor-neutral firewall policy.

14. The service network of claim 13, wherein the service activation tool forms one or more Access Control Lists (ACLs) in a vendor-neutral format using the service activation tool for each firewall, and wherein the service activation tool configures one or more fix-up rules associated with the one or more ACLs in a vendor-neutral format for each firewall.

15. The service network of claim 14, wherein each ACL comprises one or more one or more Access Control Entries (ACEs).

16. The service network of claim 15, wherein the service activation tool rearranges sequence of processing of each formed ACE as a function of a customer specified order of firewall processing.

17. The service network of claim 12, wherein the network configuration management tool uploads the formed vendor-specific firewall policy into one or more PEs associated with the selected VPN.

18. A computer system comprising:
  a computer network, wherein the computer network has a plurality of network elements, and wherein the plurality of network elements has a plurality of network interfaces;
  a network interface;
  an input module coupled to the network interface that receives topology data via the network interface;
  a processing unit; and
  a memory coupled to the processor, the memory having stored therein code associated with provisioning one or more firewalls associated with one or more Virtual Private Networks (VPNs) in a Multi-Protocol Label Switching-Virtual Private Network (MPLS-VPN) service network, the code causes the processor to perform a method comprising:
    creating a vendor-neutral firewall policy;
    selecting one of the one or more VPNs that requires provisioning a vendor-neutral firewall; and
    transforming the created vendor-neutral firewall policy to a vendor-specific firewall policy as a function of the selected one of the one or more VPNs.

19. The system of claim 18, wherein, in creating the vendor-neutral firewall policy, a service activation tool comprises:
  a generic graphical user interface tool that facilitates in configuring the vendor-neutral firewall policy.

20. The system of claim 18, wherein creating the vendor-neutral firewall policy comprises:
  forming one or more access control lists (ACLs) in a vendor-neutral format using a service activation tool for each firewall; and
  configuring one or more fix-up rules associated with the formed one or more ACLs in a vendor-neutral format using the service activation tool for each firewall.

21. The system of claim 20, wherein, in forming the one or more ACLs, each of the ACLs comprises one or more access control entries (ACEs).

* * * * *

UNITED STATES PATENT AND TRADEMARK OFFICE
CERTIFICATE OF CORRECTION

PATENT NO. : 8,914,868 B2  Page 1 of 1
APPLICATION NO. : 11/367653
DATED : December 16, 2014
INVENTOR(S) : Prasanna Anantharamaiah et al.

It is certified that error appears in the above-identified patent and that said Letters Patent is hereby corrected as shown below:

On the Title page, item (12), "Anantharamiah et al." should read -- Anantharamaiah et al. --.

On the Title page, in item (75), Inventors, in column 1, line 1, delete "Prasanna Anantharamiah" and insert -- Prasanna Anantharamaiah --, therefor.

Signed and Sealed this
Seventh Day of July, 2015

Michelle K. Lee
*Director of the United States Patent and Trademark Office*